United States Patent
Motoyama

(10) Patent No.: US 6,915,342 B1
(45) Date of Patent: Jul. 5, 2005

(54) METHOD AND SYSTEM FOR MAINTAINING THE BUSINESS OFFICE APPLIANCE THROUGH LOG FILES

(75) Inventor: Tetsuro Motoyama, Cupertino, CA (US)

(73) Assignee: Ricoh Company Limited, Tokyo (JP)

(*) Notice: Subject to any disclaimer, the term of this patent is extended or adjusted under 35 U.S.C. 154(b) by 0 days.

(21) Appl. No.: 09/453,877

(22) Filed: Feb. 4, 2000

(51) Int. Cl.$^7$ .................... G06F 15/173; H04L 12/00
(52) U.S. Cl. .................. 709/224; 709/238; 709/206; 395/835
(58) Field of Search ................... 709/224, 223

(56) References Cited

U.S. PATENT DOCUMENTS

| | | | | |
|---|---|---|---|---|
| 5,119,377 A | * | 6/1992 | Cobb et al. ............ | 714/38 |
| 5,819,094 A | * | 10/1998 | Sato et al. ............. | 717/131 |
| 5,819,110 A | * | 10/1998 | Motoyama ............ | 379/100.05 |
| 5,887,216 A | * | 3/1999 | Motoyama ............ | 358/1.15 |
| 5,908,493 A | | 6/1999 | Krymsky | |
| 6,003,070 A | * | 12/1999 | Frantz .................. | 709/206 |
| 6,085,196 A | | 7/2000 | Motoyama et al. | |
| 6,108,688 A | * | 8/2000 | Nielsen ................ | 709/206 |
| 6,167,448 A | * | 12/2000 | Hemphill et al. ..... | 707/501.1 |
| 6,208,956 B1 | | 3/2001 | Motoyama | |
| 6,263,488 B1 | * | 7/2001 | Fortin et al. .......... | 717/127 |
| 6,279,015 B1 | | 8/2001 | Fong et al. | |
| 6,317,848 B1 | * | 11/2001 | Sorens et al. ......... | 714/48 |
| 6,330,628 B1 | * | 12/2001 | Motoyama ........... | 358/1.15 |
| 6,430,613 B1 | * | 8/2002 | Brunet et al. ......... | 709/223 |
| 6,457,038 B1 | * | 9/2002 | Defosse ............... | 709/200 |
| 6,510,454 B1 | * | 1/2003 | Walukiewicz ......... | 709/206 |
| 6,510,466 B1 | * | 1/2003 | Cox et al. ............. | 709/229 |
| 6,581,092 B1 | * | 6/2003 | Motoyama et al. .... | 709/219 |
| 6,631,247 B1 | * | 10/2003 | Motoyama et al. .... | 399/8 |

FOREIGN PATENT DOCUMENTS

JP  2-172348  7/1990

OTHER PUBLICATIONS

U.S. Appl. No. 09/453,877, filed Feb. 4, 2000, Motoyama.
U.S. Appl. No. 10/830,064, filed Apr. 23, 2004, Motoyama et al.
U.S. Appl. No. 10/831,187, filed Apr. 26, 2004, Motoyama et al.
U.S. Appl. No. 08/738,659, filed Oct. 30, 1996, Pending.
U.S. Appl. No. 08/738,461, filed Oct. 30, 1996, Pending.
U.S. Appl. No. 08/883,492, filed Jun. 26, 1997, Pending.
U.S. Appl. No. 09/108,705, filed Jul. 1, 1998, Pending.
U.S. Appl. No. 09/107,989, filed Jul. 1, 1998, Pending.
U.S. Appl. No. 09/192,583, filed Nov. 17, 1998, Pending.
U.S. Appl. No. 09/311,148, filed May 13, 1999, Pending.
U.S. Appl. No. 09/408,443, filed Sep. 29, 1999, Pending.
U.S. Appl. No. 09/407,769, filed Sep. 29, 1999, Pending.
U.S. Appl. No. 09/393,677, filed Sep. 10, 1999, Pending.
U.S. Appl. No. 09/440,692, filed Nov. 16, 1999, Pending.
U.S. Appl. No. 09/440,647, filed Nov. 16, 1999, Pending.
U.S. Appl. No. 09/440,646, filed Nov. 16, 1999, Pending.
U.S. Appl. No. 09/440,693, filed Nov. 16, 1999, Pending.
U.S. Appl. No. 09/440,645, filed Nov. 16, 1999, Pending.
U.S. Appl. No. 09/457,669, filed Dec. 9, 1999, Pending.
U.S. Appl. No. 09/453,877, filed Feb. 4, 2000, Pending.
U.S. Appl. No. 10/167,497, filed Jun. 13, 2002, Pending.

* cited by examiner

Primary Examiner—Rupal Dharia
Assistant Examiner—April L Baugh
(74) Attorney, Agent, or Firm—Oblon, Spivak, McClelland, Maier & Neustadt, P.C.

(57) ABSTRACT

A method and system for monitoring a business office appliance by a remote service center using logs that are transferred to the remote service center. When the service center analyzes the data in the logs, it can detect warning messages or error messages from application software controlling the monitored appliances and remotely diagnose or fix those monitored appliances.

21 Claims, 13 Drawing Sheets

METHOD AND SYSTEM FOR MAINTAINING THE BUSINESS OFFICE APPLIANCE THROUGH LOG FILES

CROSS-REFERENCE TO RELATED APPLICATIONS

REFERENCED-APPLICATIONS

The present application is related to the following U.S. applications and patents: application Ser. No. 09/440,692 of Nov. 16, 1999; application Ser. No. 09/440,647 of Nov. 16, 1999; application Ser. No. 09/440,646 of Nov. 16, 1999; application Ser. No. 09/440,693 of Nov. 16, 1999; application Ser. No. 09/440,645 of Nov. 16, 1999; application Ser. No. 09/408,443 of Sep. 29, 1999; application Ser. No. 09/407,769 of Sep. 29, 1999; application Ser. No. 09/393,677 of Sep. 10, 1999; application Ser. No. 09/311,148 of May 13, 1999; application Ser. No. 09/192,583 of Nov. 17, 1998; application Ser. No. 08/883,492 of Jun. 26, 1997; application Ser. No. 09/108,705 of Jul. 1, 1998; application Ser. No. 09/107,989 of Jul. 1, 1998; application Ser. No. 08/738,659 of Oct. 30, 1996; application Ser. No. 08/738,461 of Oct. 30, 1996; application Ser. No. 09/457,669 of Dec. 9, 1999; application Ser. No. 08/916,009 of Aug. 21, 1997; application Ser. No. 07/902,462 of Jun. 19, 1992; application Ser. No. 07/549,278 of Jul. 6, 1990; U.S. Pat. Nos. 5,908,493; 5,887,216; 5,818,603; 5,819,110; 5,774,678; 5,649,120; 5,568,618; 5,544,289; 5,537,554; and 5,412,779.

The contents of each of those applications and patents is incorporated herein by reference.

STATEMENT REGARDING FEDERALLY SPONSORED RESEARCH

Not Applicable

REFERENCE TO A MICROFICHE APPENDIX

Not Applicable

BACKGROUND OF THE INVENTION

1. Description of Related Art

The cross-referenced applications and patents listed above show various methods to communicate with networked devices and appliances. In particular, the service center can establish communication via either direct communication (e.g., a connectionless (UDP) socket or connection-based (TCP) socket using an information protocol (e.g., an HTTP or FTP), or indirect communication (e.g., a store-and-forward system such as electronic mail (e-mail))).

Business Office Appliances, such as copiers, facsimiles, printers and image storage systems, have been connected to networks recently. However, the maintenance system for those systems have been relying upon a service group that sends a service person when the system malfunctions. As the software of those appliances becomes more complex, the maintenance there of becomes crucial to the ongoing operation of the application software.

2. Field of the Invention

The present invention generally relates to the use of a network device/appliance that stores its application logs and sends those logs to a service center as part of remote software maintenance. This invention further relates to a service center or resource administration station for finding errors at the service center and passing the information to the maintenance group.

BRIEF SUMMARY OF THE INVENTION

Accordingly, it is an object of the present invention to provide a method, system and computer program product for implementing the logs created by application software of those appliances.

It is another object of this invention to provide a method, system and computer program product in which the log is sent, using FTP or e-mail, to the service center for maintenance analysis.

These and other objects are accomplished by a method, system, and computer program product in which application logs are transferred from Business Office Appliances to a service center. When the service center analyzes the data in the logs, it can detect warning messages or error messages from application software controlling those appliances. Those messages indicate the existence of potentially critical errors. The service center can then send the information to the Maintenance group that can find a way to solve the problems.

BRIEF DESCRIPTION OF THE SEVERAL VIEWS OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
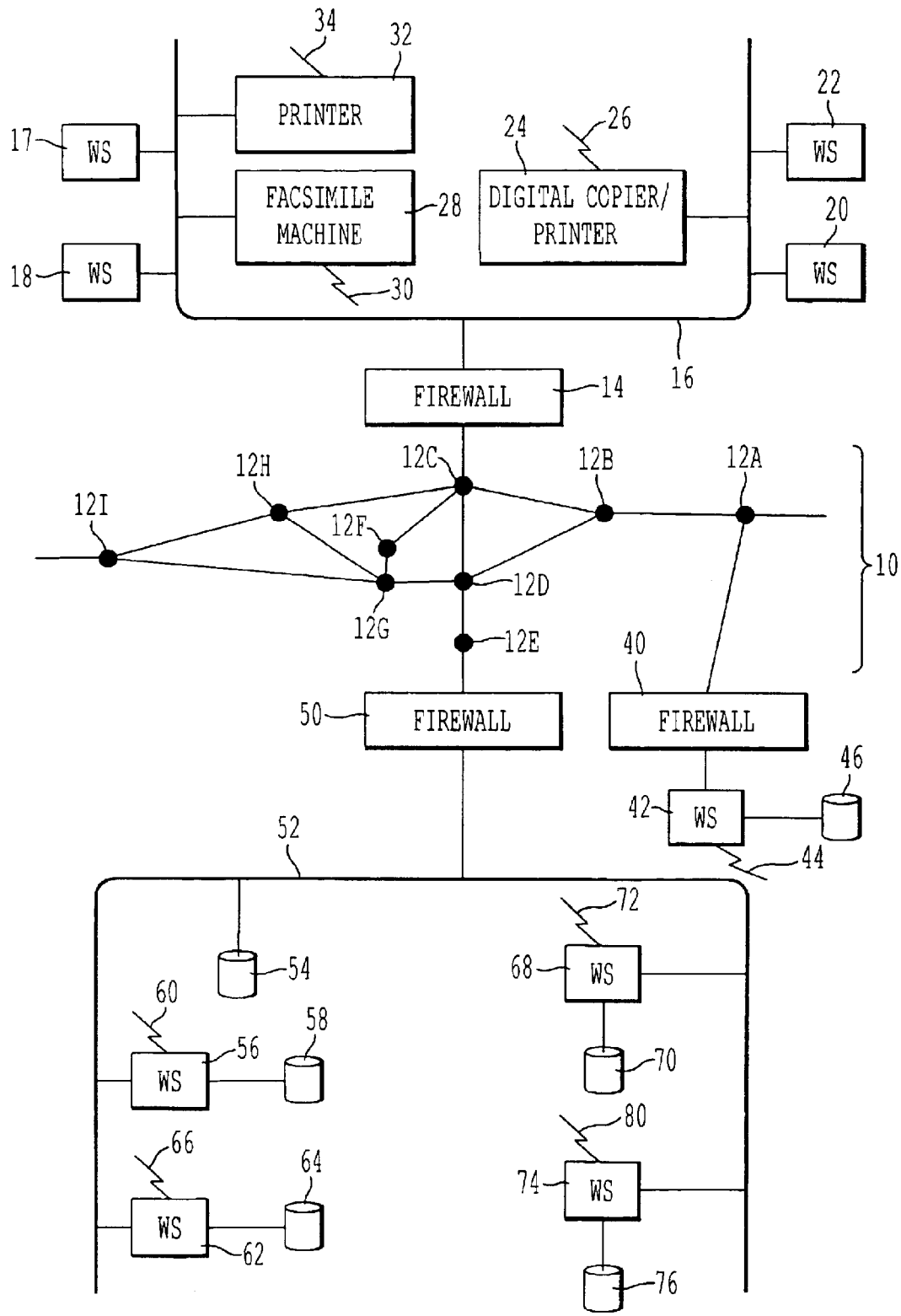
FIG. 1 illustrates a system configuration in which three networked business office appliances are connected to a network of computers and databases through a wide area network (WAN)

Referring now to the drawings, wherein like numerals designate identical or corresponding parts throughout the several views, and more particularly to FIG. 1 thereof the present invention includes various machines and computers for monitoring, diagnosing, controlling and maintaining the operation of the business devices and appliances. In FIG. 1, there is a first network 16 (e.g., a Local Area Network (LAN)) connected to computer workstations 17, 18, 20, and 22. The workstations can be any type of computers including Microsoft Operating System Computers, Unix-based computers, or Apple Operating System Computers. Also connected to the network 16 are a digital copier/printer 24, a facsimile machine 28, and a printer 32. The devices 24, 28 and 32 are referred to herein as machines, business office appliances, or monitored devices and include any of the devices discussed below. Also, a facsimile server (not illustrated), a thin server (not illustrated), a network image scanner (not illustrated), or an image storage system (not illustrated) may be connected to the network 16 and may have a telephone, ISDN (Integrated Services Digital Network), wireless or cable connection. In addition to the digital copier/printer 24, facsimile machine 28, and printer 32 being connected to the network 16, those devices may also include conventional telephone and/or ISDN and/or wireless and/or cable connections 26, 30, and 34, respectively. As is explained below, the business office machines, business office appliances or business devices 24, 28, and 32 communicate with a remote monitoring, diagnosis, maintenance and control station, also referred to as a monitoring device, through an Intranet or the Internet via the network 16 or by a direct telephone, ISDN, wireless or cable connection.

In FIG. 1, a WAN 10 (e.g., the Internet) includes a plurality of interconnected computers and routers designated by 12A–12I. The manner of communicating over the Internet is known through Request For Comments ("RFC") documents obtained from "http://www.ietf.org/rfc.html." TCP/IP (Transmission Control Protocol/Internet Protocol) related communication also is described in "TCP/IP Illustrated: Vol. 1, the Protocols," by Stevens from Addison-Wesley Publishing Company, 1994, which is incorporated herein by reference.

In FIG. 1, a firewall 14 is connected between the WAN 10 and the network 16. A firewall is a hardware device or software that allows only authorized computers on one side of the firewall to connect to a network or computer on the other side of the firewall. Firewalls are known and commercially available devices or software (e.g., SunScreen and Firewall 1 from Sun Microsystems, Inc.). Similarly, a firewall 50 is connected between the WAN 10 and a network 52. Also, a firewall 40 is connected between the WAN 10 and a workstation 42.

The network 52 is a conventional network and includes a plurality of workstations 56, 62, 68 and 74. Those workstations may be located at different departments within a company such as marketing, manufacturing, design engineering and customer service departments. In addition to the workstations connected via the network 52, there is a workstation 42 which is not directly connected to the network 52. Information in a database stored in a disk 46 may be shared using proper encryption and protocols over the WAN to the workstations connected directly to the network 52. Also, the workstation 42 includes a direct connection to at least one of a telephone line, an ISDN line, a wireless network, and a cable, each of which is designated by numeral 44. The cable used by this invention may be implemented using a cable which typically is used to carry television programming, a cable which provides for high speed communication of digital data typically used with computers or the like, or any other desired type of cable.

Information of the business office machine/device/appliance 24, 28 and 32 may be stored in one or more of the databases stored in the disks 46, 54, 58, 64, 70 and 76. Each of the customer service, marketing, manufacturing, and engineering departments may have their own database or may share from one or more databases. Each of the disks used to store databases is a non-volatile memory (e.g., a hard disk or optical disk). Alternatively, the databases may be stored in any storage device including solid state and/or semiconductor memory devices. As an illustrative example, disk 64 contains the marketing database, disk 58 contains the manufacturing database, disk 70 contains the engineering database, and disk 76 contains the customer service database. Alternatively, the disks 54 and 46 store one or more of the databases, such as service history, configuration and software information including device drivers and firmware, for various business office machines, devices, and appliances.

In addition to the workstations 56, 62, 68, 74 and 42 being connected to the WAN 10 via network 52, those workstations may also include a connection to a telephone line, ISDN, wireless or cable which provides a direct connection to the machine being monitored, diagnosed, maintained and/or controlled. Alternatively, those workstations may be connected to the machine through the WAN 10 using an encrypted connection. Additionally, if one of the WAN, telephone, ISDN, wireless, or cable connection is not operating properly, one of the other connections can be automatically used for communication.

A feature of the present invention is the use of e-mail or other network communication between a machine and a computer for (1) monitoring, diagnosing, maintaining and controlling the machine over a WAN or LAN, and (2) transmitting information regarding the machine's state.

Figure 2:
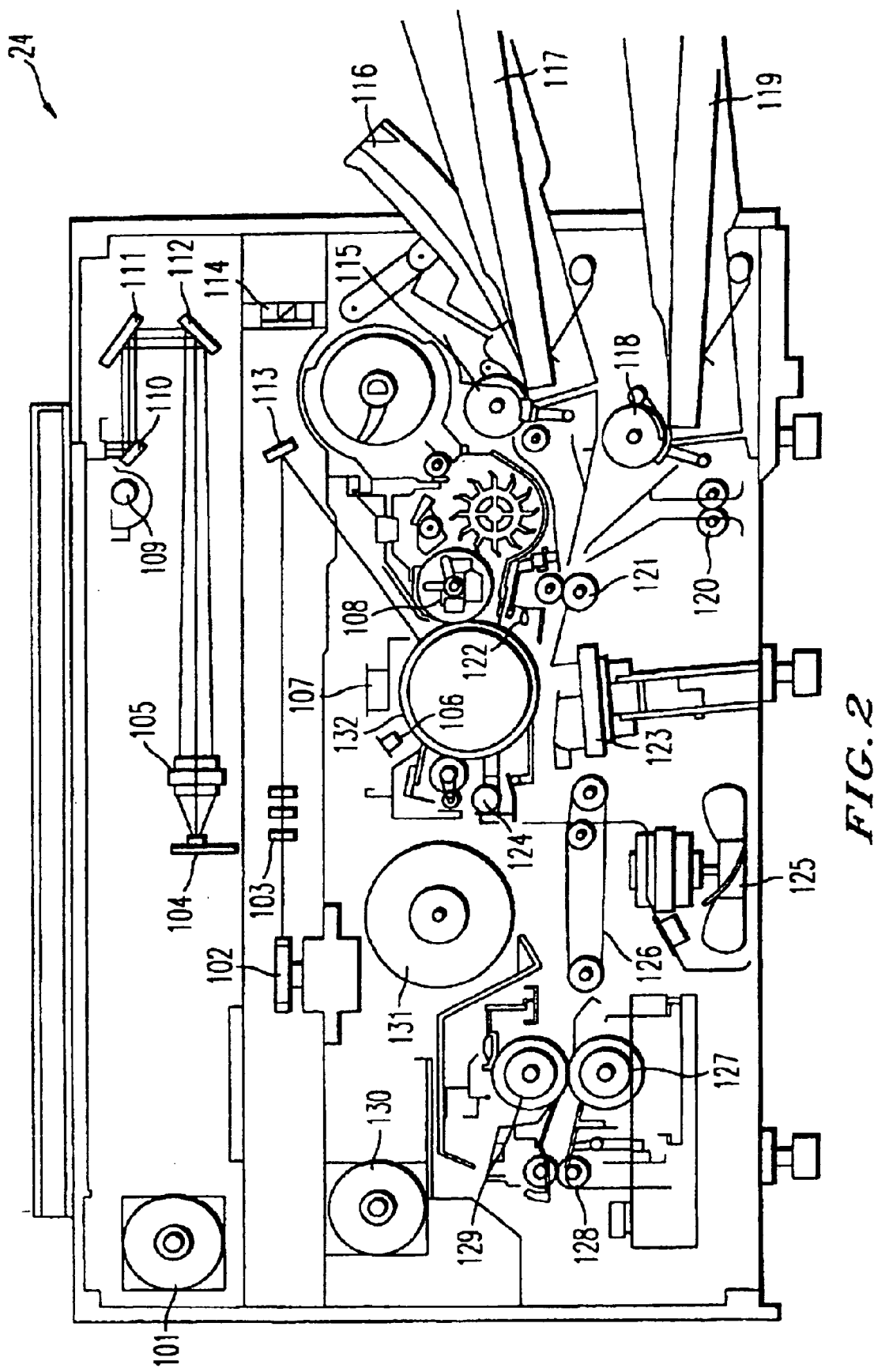
FIG. 2 illustrates the components of a digital copier/printer.

FIG. 2 illustrates the mechanical layout of the digital copier/printer 24 illustrated in FIG. 1. In FIG. 2, 101 is a fan for the scanner, 102 is a polygon mirror used with a laser printer, and 103 designates and FΘ lens used to collimate light from a laser (not illustrated). Reference numeral 104 designates a sensor for detecting light from the scanner, 105 is a lens for focusing light from the scanner onto the sensor 104, and 106 is a quenching lamp used to erase images on the photoconductive drum 132. There is a charging corona unit 107 and a developing roller 108. Reference numeral 109 designates a lamp used to illuminate a document to be scanned and 110, 111 and 112 designate mirrors used to reflect light onto the sensor 104. There is a drum mirror 113 used to reflect light to the photoconductive drum 132 originating from the polygon mirror 102. Reference number 114 designates a fan used to cool the charging area of the digital copier/printer, and 115 is a first paper feed roller used for feeding paper from the first paper cassette 117, and 116 is a manual feed table. Similarly, 118 is a second paper feed roller for the second cassette 119. Reference numeral 120 designates a relay roller, 121 is a registration roller, 122 is an image density sensor and 123 is a transfer/separation corona unit. Reference numeral 124 is a cleaning unit, 125 is a vacuum fan, 126 illustrates a transport belt, 127 is a pressure roller, and 128 is an exit roller. Reference numeral 129 is a hot roller used to fix toner onto the paper, 130 is an exhaust fan and 131 is the main motor used to drive the digital copier.

Figure 3:
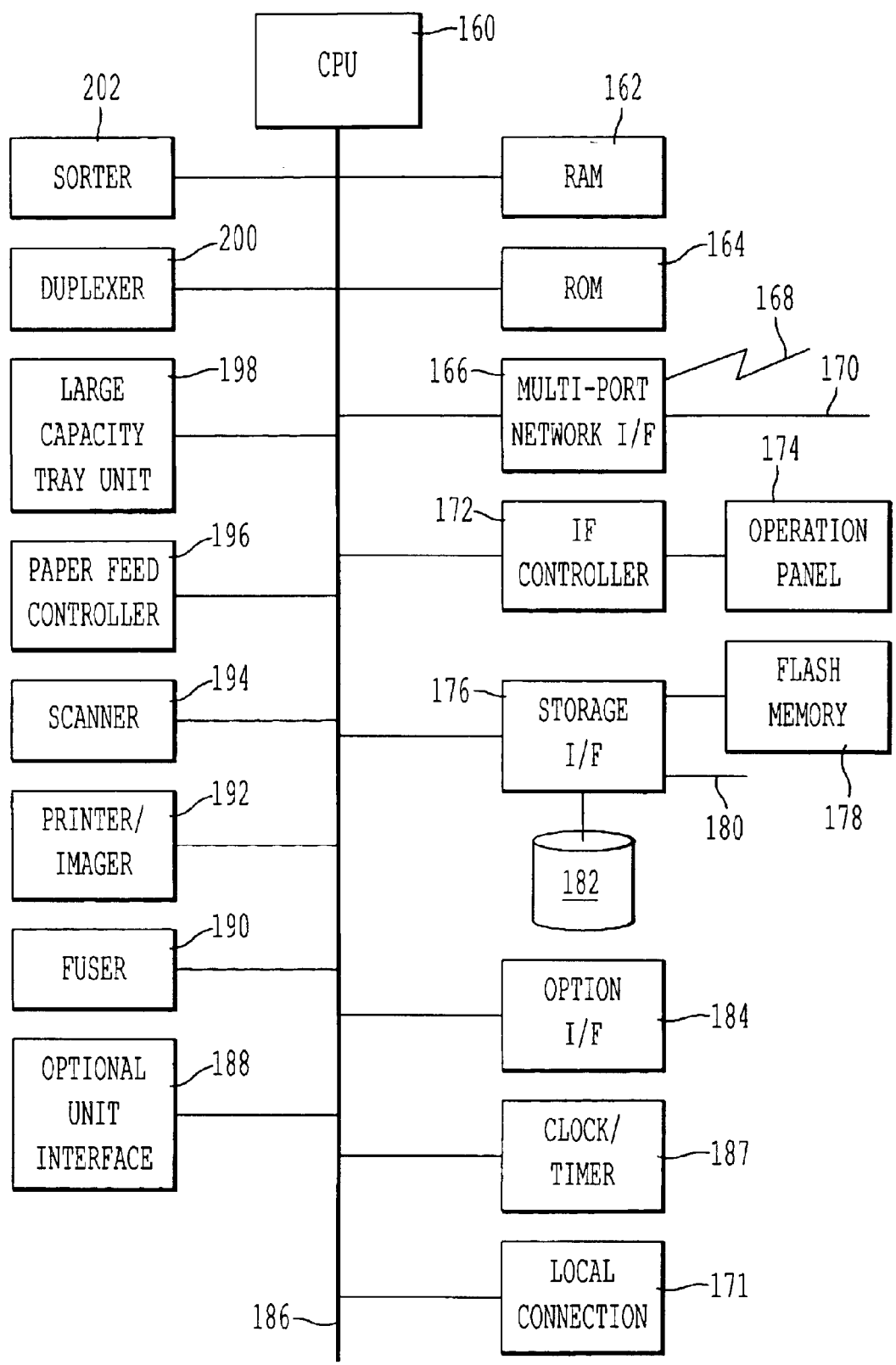
FIG. 3 illustrates the electronic components of the digital copier/printer illustrated in FIG. 2.

FIG. 3 illustrates a block diagram of the electronic components illustrated in FIG. 2. The CPU 160 is a microprocessor and acts as the system controller. There is a random access memory 162 to store dynamically changing information including operating parameters of the digital copier. A read only or non-volatile memory 164 stores the program code used to run the digital copier and also information describing the copier (static-state data) such as model number, serial number, installed ROM version, manufacturing lot number of the copier and default parameters.

There is a multi-port network interface 166 which allows the digital copier to communicate with external devices. Reference numeral 168 represents a telephone, ISDN, or cable line and 170 represents a LAN connection. Further information on the multi-port network interface is described with respect to FIG. 4.

The Local connection 171 includes one or more connections such as SCSI, IEEE 1394, USB, Centronics and RS232 to communicate with the host computer that is directly connected to the business office appliance. An interface controller 172 is used to connect an operation panel 174 to a system bus 186. The operation panel 174 includes standard input and output devices found on a digital copier including a copy button, keys to control the operation of the copier such as number of copies, reducement/enlargement, darkness/lightness, etc. Additionally, a liquid crystal display may be included within the operation panel 174 to display parameters, and messages of the digital copier to a user. Alternatively, the touch panel may be used for the display and keys.

A storage interface 176 connects storage devices to the system bus 186. The storage devices include a re-writable, non-volatile memory (RNVM) 178 (e.g., at least one of a flash memory, a conventional EEPROM, a disk 182 and a ferroelectric memory). The disk 182 includes at least one of a hard disk, an optical disk, and a floppy disk drive. There is a connection 180 connected to the storage interface 176 which allows for additional memory devices to be connected to the digital copier. The RNVM 178 is used to store semi-static state data which describes parameters of the digital copier which infrequently change over the life of the copier. Such parameters include the options and configuration of the digital copier. The RNVM 178 also may contain the portion of software that can be updated in the future through the network connection or other mechanism. An option interface 184 allows additional hardware such as a PC card to be connected to the digital copier. A clock/timer 187 is utilized to keep track of both the time and date and also to measure elapsed time.

On the left side of FIG. 3, the various sections making up the digital copier are illustrated. Reference numeral 202 designates a sorter and contains sensors and actuators used to sort the output of the digital copier. There is a duplexer 200 which allows a duplex operation to be performed by the digital copier and includes conventional sensors and actuators. The digital copier includes a large capacity tray unit 198 which allows paper tray holding a large number of sheets to be used with the digital copier. The large capacity tray unit 198 includes conventional sensors and actuators.

A paper feed controller 196 is used to control the operation of feeding paper into and through the digital copier. A scanner 194 is used to scan images into the digital copier and includes conventional scanning elements such as a light, mirror, etc. Additionally, scanner sensors include a home position sensor to determine that the scanner is in the home position and a lamp thermistor to ensure proper operation of the scanning lamp. There is a printer/imager 192 which prints the output of the digital copier and includes a conventional laser printing mechanism, a toner sensor, and an image density sensor. A fuser 190 is used to fuse the toner onto the page using a high temperature roller and includes an exit sensor, a thermistor to assure that the fuser 190 is not overheating, and an oil sensor. Additionally, there is an optional unit interface 188 used to connect to optional elements of the digital copier such as an automatic document feeder, a different type of sorter/collator, or other elements which can be added to the digital copier.

Figure 4:
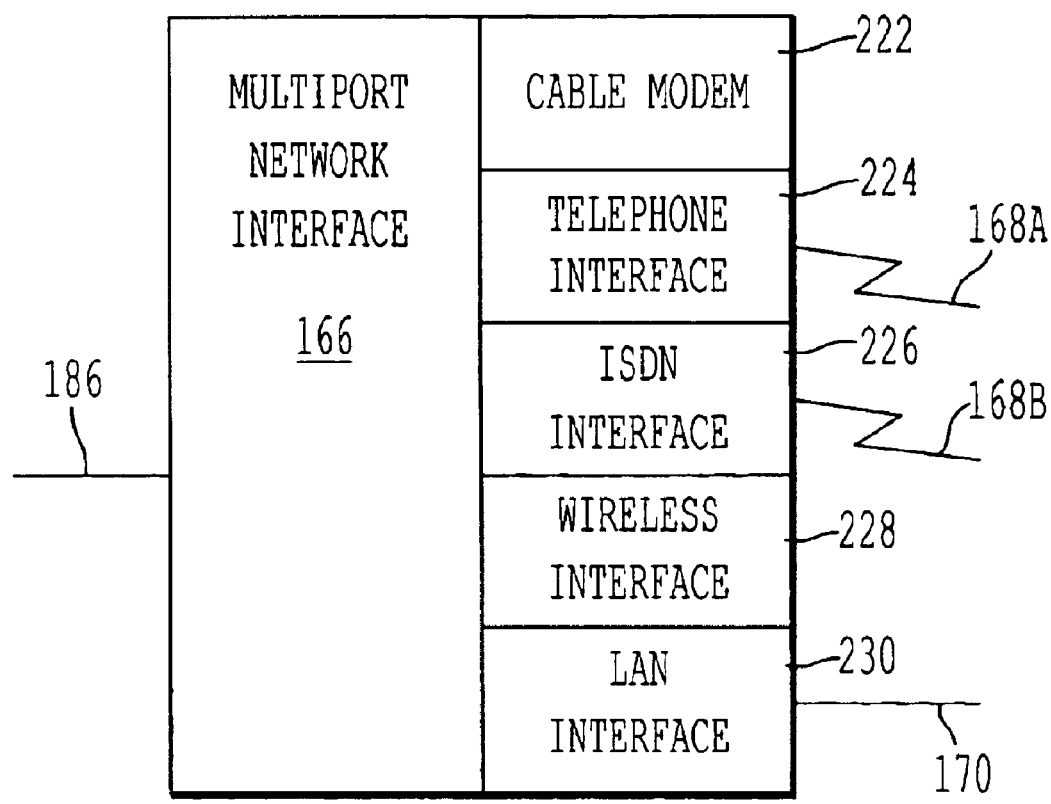
FIG. 4 illustrates components of a multi-port network interface included in the electronic components illustrated in FIG. 3.

FIG. 4 illustrates details of the multi-port network interface 166. The digital copier may communicate to external devices through a Cable Modem 222 (which has a high speed connection over a cable to the Internet), a conventional telephone interface 224 (which connects to a phone line 168A), an ISDN interface 226 (which connects to an ISDN line 168B), a Wireless Interface 228 (which connects to a wireless network), and a LAN interface 230 (which connects to a local area network or Intranet). Actual interfaces may incorporate one or more interfaces described here.

The CPU or other microprocessor or circuitry executes a monitoring process to monitor the state of each of the sensors of the digital copier, and a sequencing process is used to execute the instructions of the code used to control and operate the digital copier. Additionally, there is a central system control process executing to control the overall operation of the digital copier and a communication process used to assure reliable communication to external devices connected to the digital copier. The system control process monitors and controls data storage in a static state memory such as ROM 164 of FIG. 3, a semi-static memory such as the RNVM 178, or the dynamic state data which is stored in a volatile or non-volatile memory such as the RAM 162 or the RNVM 178. Additionally, the static state data may be stored in a device other than the ROM 164 (e.g., the RNVM 178).

The above details have been described with respect to a digital copier but the present invention is equally applicable to other business office machines, devices or appliances such as an analog copier, a facsimile machine, a scanner, a printer, a facsimile server, an image storage system, or an appliance with which a user interfaces (e.g., a microwave oven, VCR, TV, refrigerator, digital camera, cellular phone, palm top computer). Additionally, the present invention includes other types of machines which operate using some communication method to contact the remote device or computer, such as a metering system including a gas, water, or electricity metering system, household appliances, vending machines, or any other devices which perform mechanical operations such as automobiles and has a need to be monitored, and perform a function. In addition to monitoring special purpose machines, and computers, the present invention can be used to monitor, control, and diagnose a general purpose computer which would be the monitored and/or controlled device, and information regarding resource usage by an end user may be communicated to a remote monitoring devices and to the end user from a remote monitoring devices.

Figure 5:
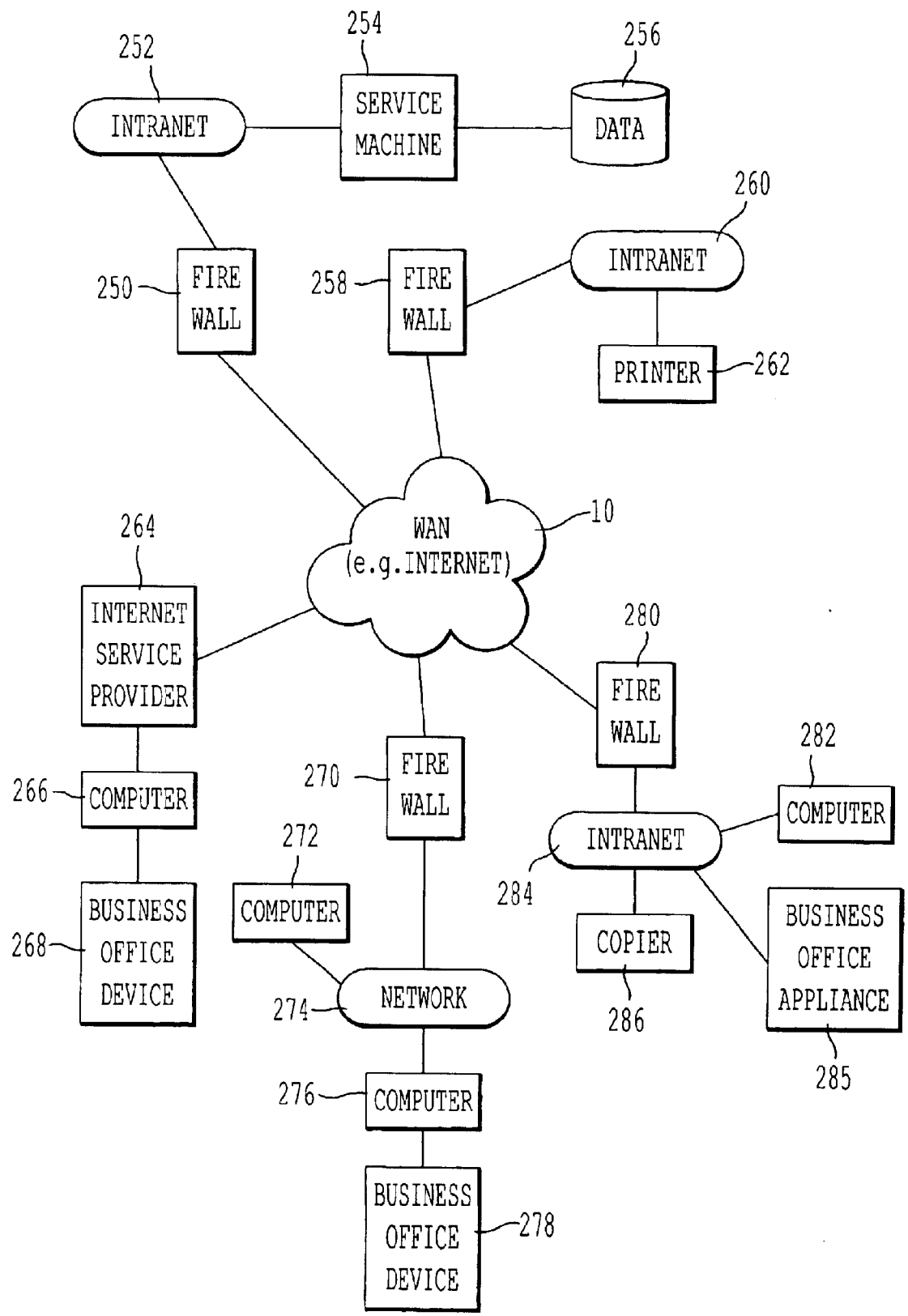
FIG. 5 illustrates an alternate system configuration in which (1) business office devices are connected to corresponding computers which are connected to a network and (2) a business office appliance is connected directly to the network.

FIG. 5 illustrates an alternate system diagram of the present invention in which different devices and sub-systems are connected to the WAN 10. However, there is no requirement to have each of those devices or sub-systems as part of invention but any individual component or subsystem illustrated in FIG. 5 is also part of the invention. Furthermore, the elements illustrated in FIG. 1 may be connected to the WAN 10 which is illustrated in FIG. 5. In FIG. 5, there is illustrated a firewall 250 connected to an Intranet 252. One of the computers or devices connected to the Intranet 252 is a service machine 254 which includes therein or has connected thereto data 256 which may be stored in a database format. The data 256 includes configuration, service history, historical usage, performance, malfunction, resource usage information for particular devices or users of the devices, and any other information including the statistical information of the operation, failure, or set-up and components or optional equipment which are being monitored. The service machine 254 may be implemented as the device or computer which requests the monitored devices to transmit data or which requests that remote control and/or diagnosis tests be performed on the monitored devices, and which transmits information to the specified destinations including the monitored devices, computers or one or more persons. The service machine 254 may be implemented as any type of device and is preferably implemented using a computerized device (e.g., a general purpose computer).

Another sub-system of FIG. 5 includes a firewall 258, an Intranet 260, and a printer 262 connected thereto. In this sub-system, there is not a separate general purpose computer connected between intranet 260 (or a different type of computer network), but rather the functions of sending and receiving electronic messages by the printer 262 (and similarly by a copier 286) are performed by circuitry, a microprocessor, or any other type of hardware contained within or mounted to the printer 262. The electronic messages includes e-mail messages and any other form of message through the network based upon various protocols such as SIMPLE MAIL TRANSFER PROTOCOL (RFC 821), FILE TRANSFER PROTOCOL (RFC 959) and Hyper Text Transfer Protocol—HTTP/1.1 (RFC 2616).

An alternate type of sub-system includes the use of an Internet service provider (ISP) 264 which may be any type of ISP including known commercial companies (e.g., America Online, AT&T, Niftyservice, Microsoft, or AtHome). In this sub-system, a computer 266 is connected to the ISP 264, through any communication means, including a modem (e.g, a telephone line modem, a cable modem, and modems which use any type of wires, ISDN line, ADSL (Asymmetric Digital Subscriber line), DSL, frame relay communication, ATM, wireless, fiber optics, and infrared light wave)). Further, a business office device 268 is connected to the computer 266. As an alternative to the business office device 268 (and any other device illustrated in FIG. 5), a different type of machine may be monitored or controlled such as a digital copier, any type of appliance, security system, or utility meter (e.g., an electrical, water, or gas utility meter), or any other device discussed herein.

Also illustrated in FIG. 5 is a firewall 270 connected to a network 274. The network 274 may be implemented as any type of computer network (e.g., Ethernet network and Token Ring). Networking software which may be used to control the network includes any desired networking software including free software (e.g, Linux) and software commercially available from Novell or Microsoft. The network 274 may be implemented as an Intranet, if desired. A computer 272 connected to the network 274 may be used as a monitoring device to control, to maintain, to obtain information from a business office device 278, and to generate reports (e.g., reports showing problems which occurred in various machines connected to the network and usage reports of the devices connected to the network 274). In this embodiment, a computer 276 is connected between the business office device 278 and the network 274. The business office device 278 is a local device for the computer 276. This computer receives e-mail or any other form of communications from the network and forwards the appropriate commands or data, or any other information to the business office device 278. While it has been stated that the business office device 278 is connected to the computer 276 as a local device, there is no requirement for a wired connection between the business office device. The communication (1) between the business office device 278 and the computer 276 and (2) on the various networks and intranets illustrated in FIG. 5 may be accomplished using wires or wireless methods (e.g., radio frequency connections and light-based (e.g., infra-red) connections). The wireless communication described herein may be established using spread spectrum techniques or any other technique, including Bluetooth Wireless Network Technology based upon Bluetooth Specification 1.0A which is described at the web site, www.bluetooth.com, which is incorporated herein by reference.

Another sub-system illustrated in FIG. 5 includes a firewall 280, an Intranet 284, a computer 282 connected thereto, a copier 286 and a business office appliance 285. The computer 282 may be used to generate reports and request diagnostic or control procedures. Those diagnostic and control procedures may be performed with respect to the copier 286 or business office appliance 285 or any of the other devices illustrated in or used with FIG. 5. While FIG. 5 illustrates a plurality of firewalls, the firewalls are preferable but optional equipment, and, therefore, the present invention may be operated without the use of firewalls. Although Service Machine 254 is on the separate Intranet 252, any computer within Intranet 260, 274, or 284 can function as the Service Machine to maintain the business office devices/appliances. For example, a very large company may want to keep its own service machine while a small company may use an outside service.

Figure 6A:
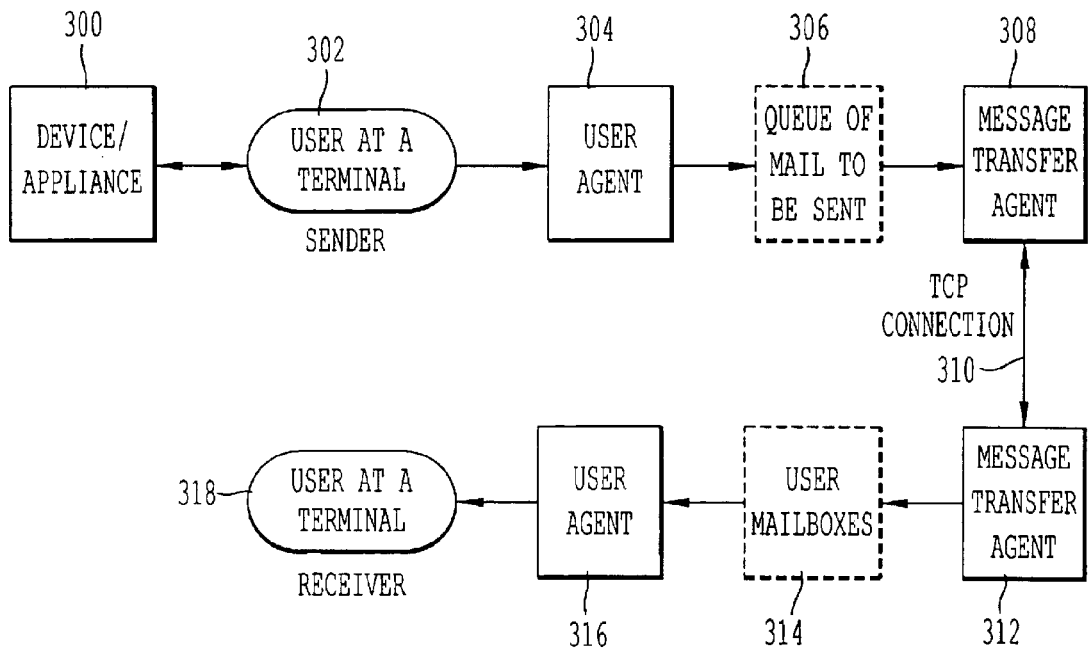
FIG. 6A is a block diagram illustrating a manner in which information may be communicated to or from a device/appliance using electronic mail.

FIG. 6A illustrates a device/appliance 300 connected to a typical e-mail exchange system which includes components 302, 304, 306, 308, 310, 312, 314, 316 and 318 which may be implemented in a conventional manner and are taken from FIG. 28.1 of Stevens, above. The device/appliance 300 may be any of the devices described herein and the user at a terminal 302 may correspond to a user at any of the illustrated computers, such as computer 276 illustrated in FIG. 5. While FIG. 6A illustrates the user at a terminal 302 as being a sender, the sending and receiving function may be reversed in FIG. 6A. Further, if desired, there may not be a need for having a user at the terminal. Connected to the user at a terminal 302 is the user agent 304. Popular user agents for Unix include Mail, mailx, mush, elm and MH. The user agent 304 creates e-mail messages to be sent and, if desired, places those messages to be sent in a queue 306. The mail to be sent is forwarded to a Message Transfer Agent (MTA) 308. A common MTA for Unix systems is Sendmail. Typically, the message transfer agents 308 and 312 exchange communication using a TCP/IP-based socket connection. It is to be noted that the communication between transfer agents 308 and 312 may occur over the Internet, but alternate connections (e.g., any network connection such as a local are a network, a wide area network and/or an Intranet) may be used. Further, any desired connection between the message transfer agents 308 and 312 may be utilized.

From the message transfer agent 312, e-mail messages are stored in user mailboxes 314 which are transferred to the user agent 316 and ultimately transmitted to the user at a terminal 318 which functions as a receiving terminal. TCP/IP provides a connection-based mode of transmission; however, a TCP/IP connection need not be established directly between the sending terminal 302 and receiving terminal 318. Thus, the transmission of an electronic mail message may be achieved using a store-and-forward mode of communication.

As the Internet is a network accessible by many people and organizations, it is not considered to be secure. Therefore, messages transmitted over the Internet should be encrypted to keep the messages confidential. Encryption mechanisms are known and commercially available which may be used with the present invention. For example, a C library function, crypt( ), is available from Sun Microsystems for use with the Unix Operating system, and other encryption and decryption routines are known and commercially available and may also be used with this invention. Examples of other encryption techniques can be found in Applied Cryptography: Protocols, Algorithms, and Source Code in C, 2nd Edition, by Bruce Schneier, John Wiley & Sons; ISBN: 0471117099, 1995, which is incorporated herein by reference.

Figure 6B:
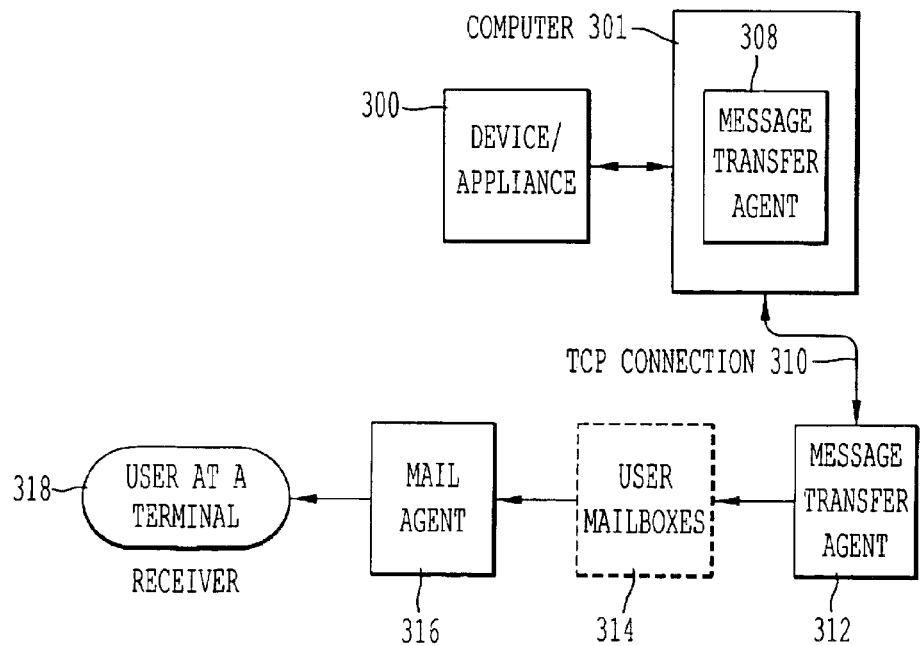
FIG. 6B illustrates an alternate way of communicating using electronic mail in which the computer that is connected to the device/appliance also serves as a message transfer agent.

As an alternative to the general structure of FIG. 6A, a single computer may be used which functions as (1) the user terminal and (2) the message transfer agent. As illustrated in FIG. 6B, the device/appliance 300 is connected to a computer 301 which includes the message transfer agent 308. If desired, the other components of the sending side of FIG. 6A may be included in the computer 301 of FIG. 6B including the user agent 304 and the queue of mail to be sent 306.

Figure 6C:
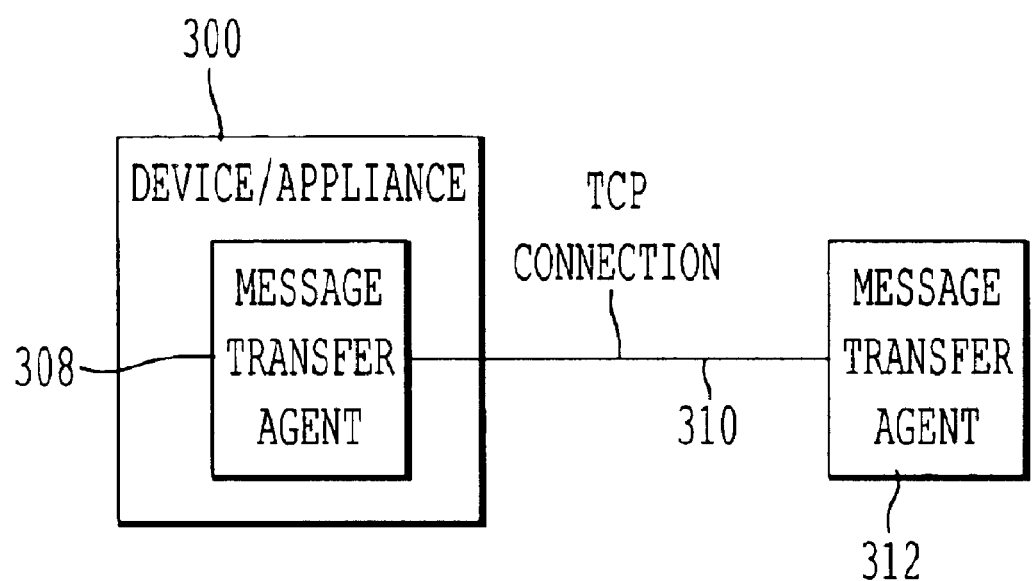
FIG. 6C illustrates an alternate way of communicating using electronic mail in which the device/appliance includes a message transfer agent.

A further alternate structure is shown in FIG. 6C in which the message transfer agent 308 is formed as part of the device/appliance 300. Further, the message transfer agent 308 is connected to the message transfer agent 312 by the TCP/IP connection 310. This embodiment of FIG. 6C illustrates a case in which the device/appliance 300 establishes its own TCP/IP connection 310 and has an e-mail capability. A common instance of this embodiment of FIG. 6C may be a device/appliance 300 that is a facsimile machine with an RFC 2305 (A Simple Mode of Facsimile Using Internet Mail) e-mail capability.

Figure 7:
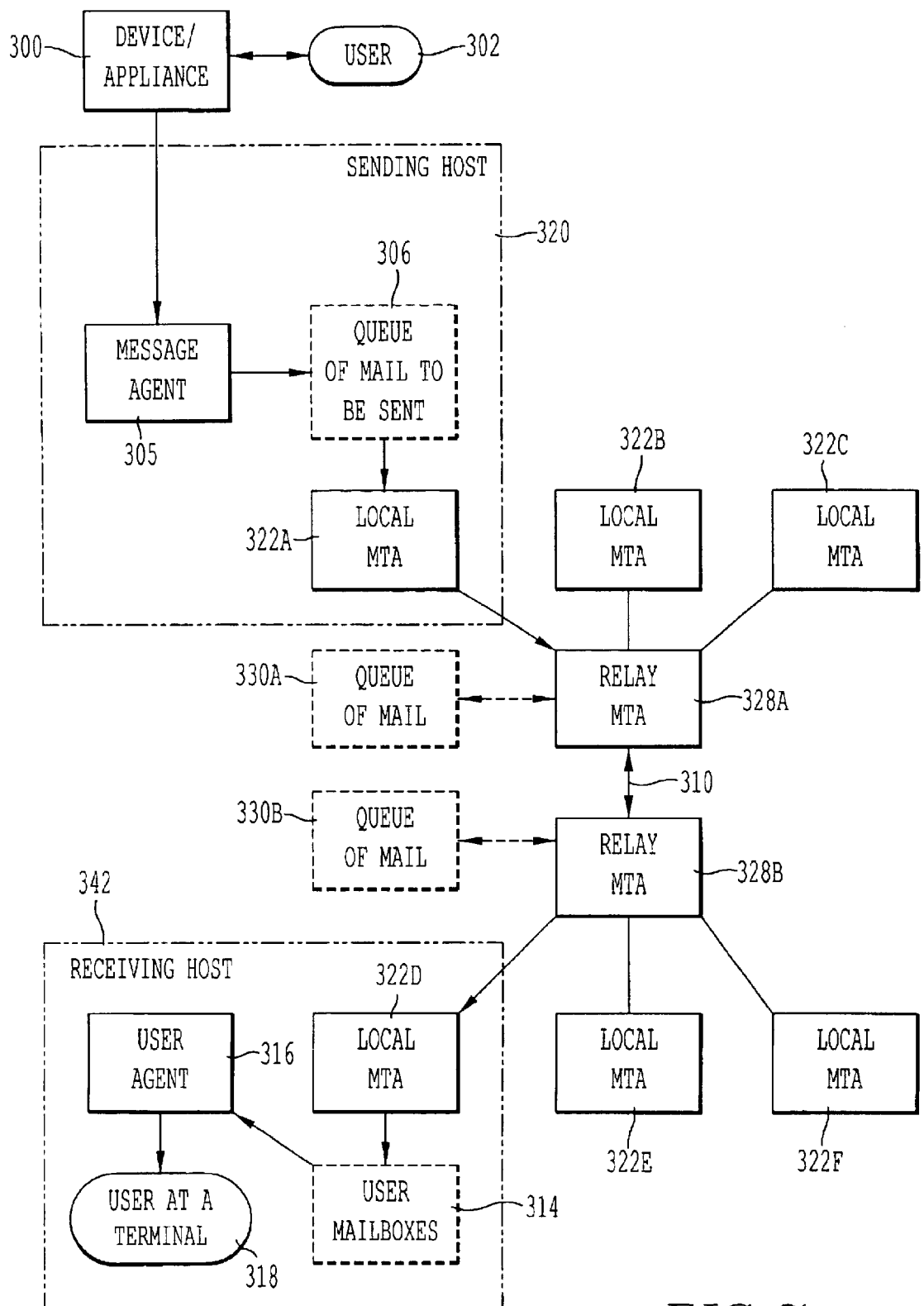
FIG. 7 illustrates an alternate manner of sending messages across the wide area network.

FIG. 7 illustrates an alternate implementation of transferring mail and is based on Figure 28.3 of Stevens. FIG. 7 illustrates an electronic mail system having a relay system at each end. There is a message agent 305 that acts similar to the user agent 304 to send the message to queue 306. The arrangement of FIG. 7 allows one system at an organization to act as a mail hub. In FIG. 7, there are four MTAs connected between the sender 300 and receiver 319. Those MTAs include local MTA 322A, relay MTA 328A, relay MTA 328B, and local MTA 322D. The most common protocol used for mail messages is SMTP (Simple Mail Transfer Protocol) RFC 821 which may be used with this invention, although any desired mail protocol may be utilized. In FIG. 7, 320 designates a sending host which includes the message agent 305, and the local MTA 322A. The device/appliance 300 is connected to, or alternatively included within, the sending host 320. As another case, the device/appliance 300 and host 320 can be in one machine where the host capability is built into the device/appliance 300. Other local MTAs include local MTA 322B and 322C. Mail to be transmitted and received may be queued in a queue of mail 330 of the relay MTA 328A. The messages are transferred across the TCP connection 310, which may be, for example, across the Internet, or may be across any other type of network or connection.

The transmitted messages are received by the relay MTA 328B and if desired, stored in a queue of mail 330B. The mail is then forwarded to the local MTA 322D of a receiving host 342. The mail may be placed in one or more of the user mailboxes 314 and subsequently forwarded to the user agent 316 and finally forwarded to the user at a terminal 318. If desired, the user may not be required to be at the terminal and the mail may be directly forwarded to the terminal without user interaction. Other local MTAs at the receiving side include local MTA's 322E and 322F which may have their own mailboxes, user agents, and terminals.

FIGS. 6A-6C and 7 show the message delivery from the device/appliance 300 to the remote terminals, such as 342. The messages can also flow from the remote terminals to the device/appliance 300 in the reverse direction using the same mail protocol (e.g., SMTP).

Figure 8:
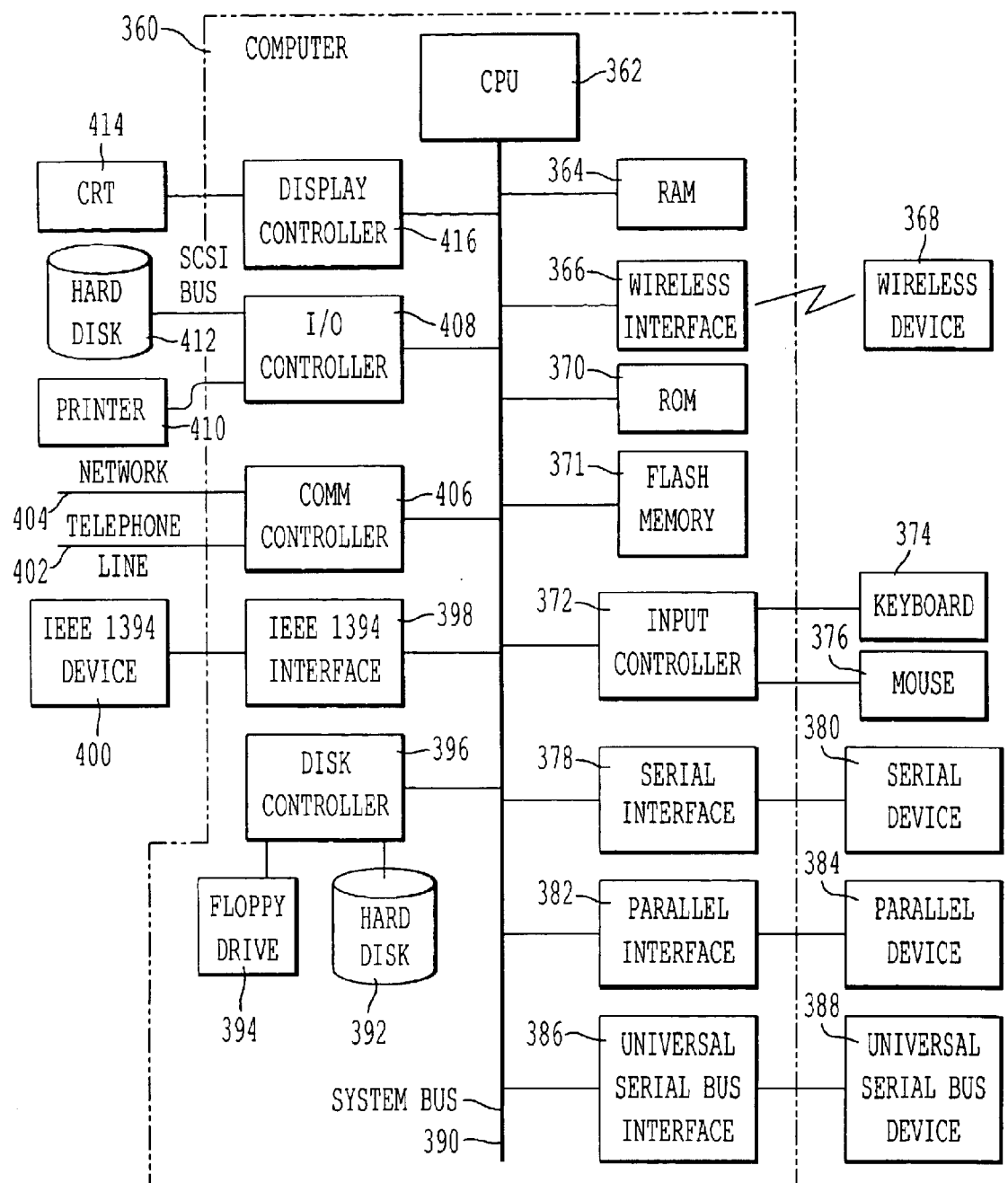
FIG. 8 illustrates an exemplary computer which may be connected to the device/appliance and used to communicate with the device/appliance.

The various computers utilized by the present invention including the computer 266 and 276 of FIG. 5 may be implemented as illustrated in FIG. 8. Further, any other computer utilized by this invention may be implemented in a similar manner to the computer illustrated in FIG. 8, if desired, including the service machine 254, computer 272, and computer 282 of FIG. 5. However, not every element illustrated in FIG. 8 is required in each of those computers. In addition, some business office appliances, such as a thin server, may be implemented in a similar manner to the computer illustrated in FIG. 8. In FIG. 8, the computer 360 includes a CPU 362 which may be implemented as any type of processor including commercially available microprocessors from companies such as Intel, Motorola, Hitachi and NEC. There is a working memory such as a RAM 364, and a wireless interface 366 which communicates with a wireless device 368. The communication between the interface 366 and device 368 may use any wireless medium such as radio waves, or light waves. The radio waves may be implemented using a spread spectrum technique.

There is a ROM 370, and a flash memory 371, although any other type of nonvolatile memory may be utilized in addition to or in place of the flash memory 371, such as EEPROM or ferroelectric memory. An input controller 372 has connected thereto a keyboard 374 and a mouse 376. There is a serial interface 378 connected to a serial device 380. Additionally, a parallel interface 382 is connected to a parallel device 384, a universal serial bus interface 386 is connected to a universal serial bus device 388, and also there is an IEEE 1394 device 400 connected to an IEEE 1394 interface 398. A disk controller 396 is connected to a floppy disk drive 394 and a hard disk 392. A communication controller 406 allows the computer 360 to communicate with other computers and devices/appliances, or send e-mail messages, (e.g., over a telephone line 402 or network 404). An I/O (Input/Output) controller 408 is connected to a printer 410 and a hard disk 412, for example, using a SCSI (Small Computer System Interface) bus. There is also a display controller 416 connected to a CRT (Cathode Ray Tube) 414, although any type of display may be used including a liquid crystal display, a light emitting diode display, a plasma display.

Figure 9:
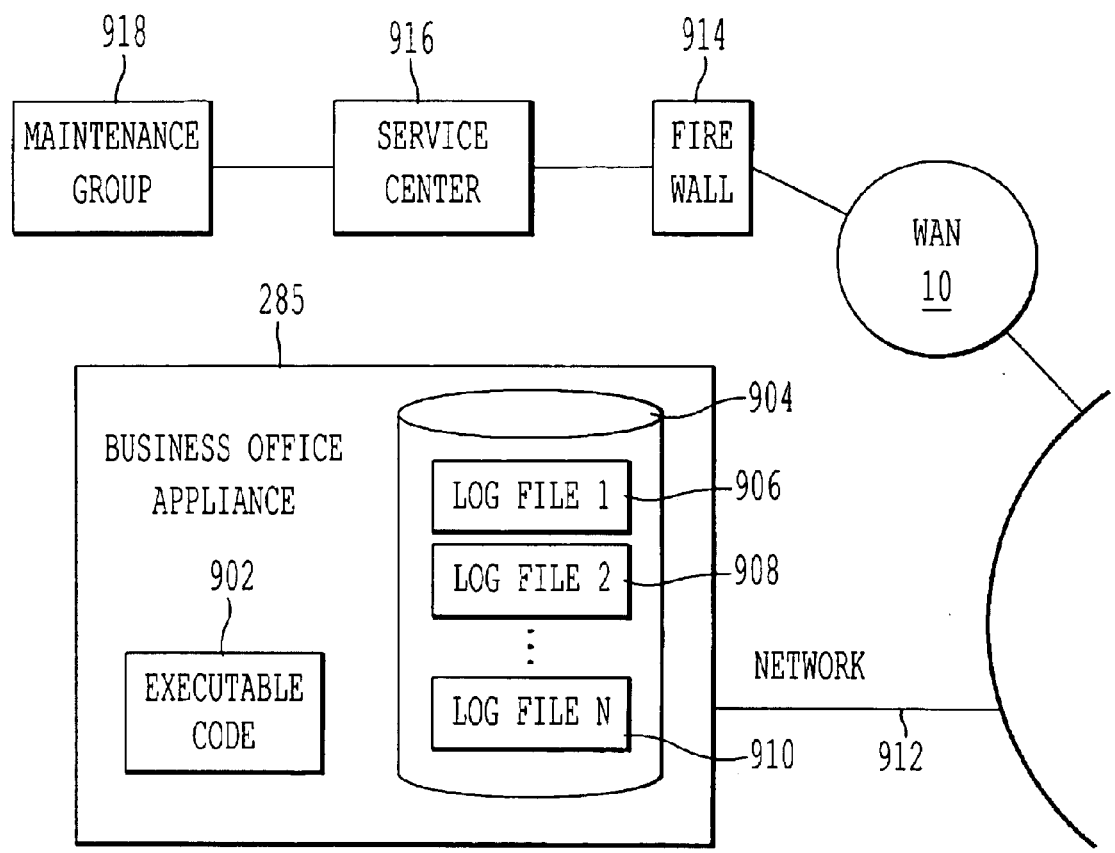
FIG. 9 illustrates a network with (1) a Business Office Appliance running application software and (2) a Service Center.

FIG. 9 shows the overall system and the components of an application. Business Office Appliance 285 has its own application software shown as Executable Code 902. The Executable Code 902 adds additional functions to the office appliance. Two examples of such a function are (1) to file the scanned images from the digital copier and (2) to print the stored images if the user desires. The Executable Code 902 is different from other codes such as control code for the operation of hardware and the code for operation panel, which are frequently stored in ROM. The Executable Code 902 produces Log Files 1, 2 to N, (labeled as 906, 908 and 910, respectively) in a storage device such as a hard disk 904. In one embodiment, the file names of those log files are associated with the date as follows: Oct20-1999File, Oct20-1999File2, and . . . Oct20-1999FileN. The files store the log information generated by the Executable Code 902 within the same day. The post-fix number denotes the log category. For example, File1 may keep track of the image scanning related log information. File2 may keep track of the communication with the storage. FileN may keep track of the printing related log information. The log may contain a header identifying the serial number of the Business Office Appliance along with IP addresses and names, the sequence of the function name that was called, the parameter values, internal values and diagnostic messages (e.g., error, warning, and OK messages). Because the Business Office Appliance cannot abnormally end, all the errors are caught by an exception handling mechanism. These errors may cause serious problems in the future and would require the repair of the Executable Code 902. The Business Office Appliance 285 is connected to the Service Center 916 through the Network 912, WAN 10, and Firewall 914. The Network 912 further may have its own Firewall (not shown). The files 906, 908 and 910 are sent to the Service Center 916 where the messages within the logs are analyzed through software. When warnings and/or errors are detected, the log files are sent to a Maintenance Group 918 to fix the problem.

Figure 10:
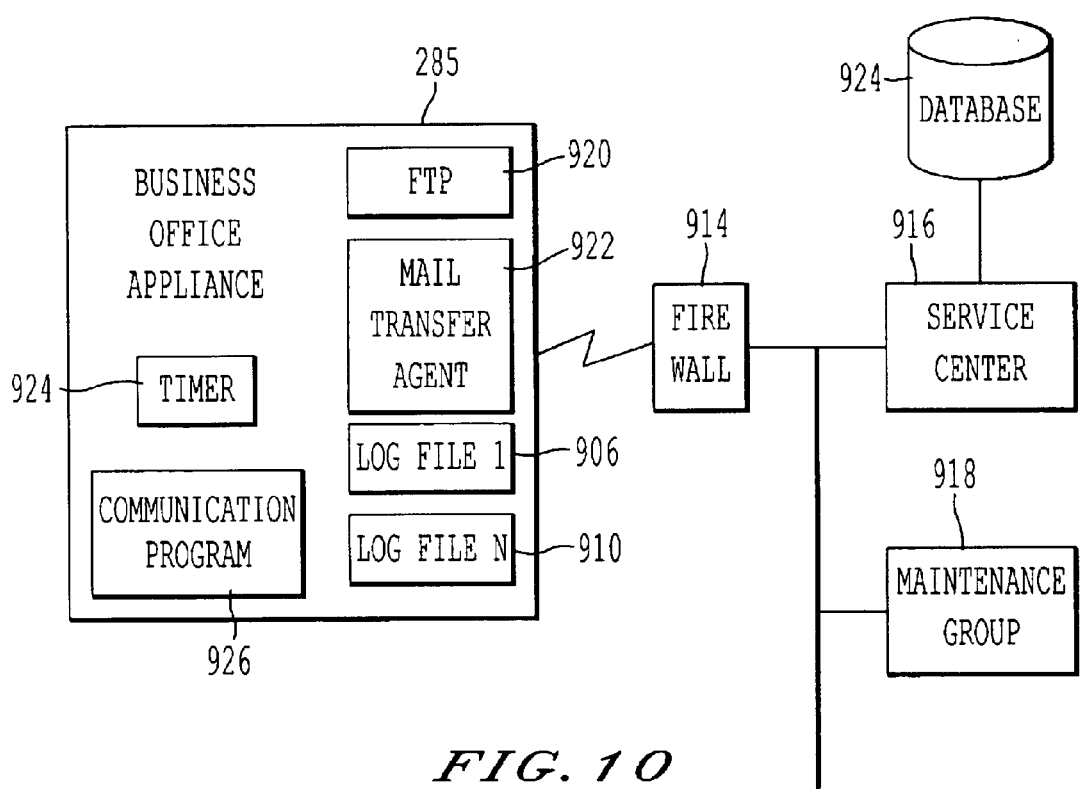
FIG. 10 illustrates components that are involved in sending the log data.

FIG. 10 shows components involved in sending the log files from Business Office Appliance 285. Timer 924 initiates the sending at the pre-determined time of the day (e.g., 0:00 am a.k.a. midnight). Timer 924 wakes up the Communication Program 926 to send the log files 906 through 910. The Communication Program 926 uses any of the communication protocols discussed above (e.g., FTP or E-mail) to send the log files. FTP and E-mail components may either be a part of the Communication Program 926 or separate programs 920 and 922 used by the Communication Program 926. Although FTP component 920 and Mail Transfer Agent 922 are shown to be located in Business Office Appliance, they may reside in a separate server on the Network 912. When Service Center 916 receives the log files, it saves the file into the database 924 which contains various information related to the Business Office Appliance 285 and the Executable Code 902, such as past history and various versions of the software components. Database 924 also keeps the log files up to a specified time (e.g., two weeks) for maintenance purposes.

Figure 11:
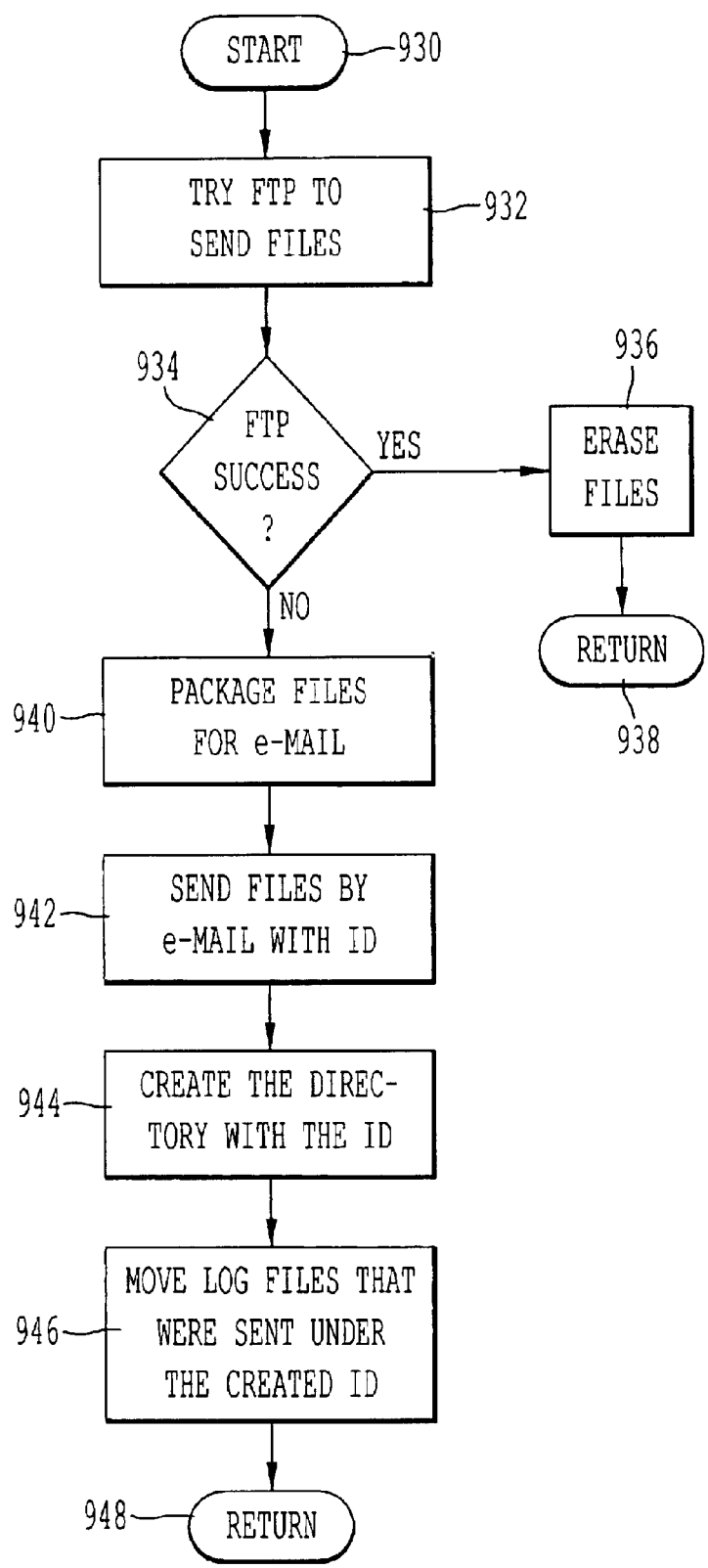
FIG. 11 is a flowchart illustrating the sending of log data through FTP or e-mail services.

FIG. 11 shows a flowchart of a main logic routine of the Communication Program 926 after the Timer 924 triggers the execution starting at step 930. At step 932, the program tries to FTP the files at the pre-assigned location. At step 934, the status of the FTP transfer is checked. If the file transfer was successful, the log files are successfully sent to the Service Center 916 and the log files for the day are no longer needed. Therefore, at step 936, the sent files are erased. At the step 938, the program returns to the state before Timer 924 triggered the program. If the file transfer is not successful, the log files are packages into an e-mail message at step 940. At the step 942, the messages are e-mailed with the ID attached. At step 944, the ID is used to create the directory and all the log files are moved to the newly created directory at step 946. At step 948, the program returns to the state before Timer 924 triggered the program.

Additional details of using e-mail is described in the previously filed application Ser. No. 08/883,492, filed on Jun. 26, 1997.

Figure 12:
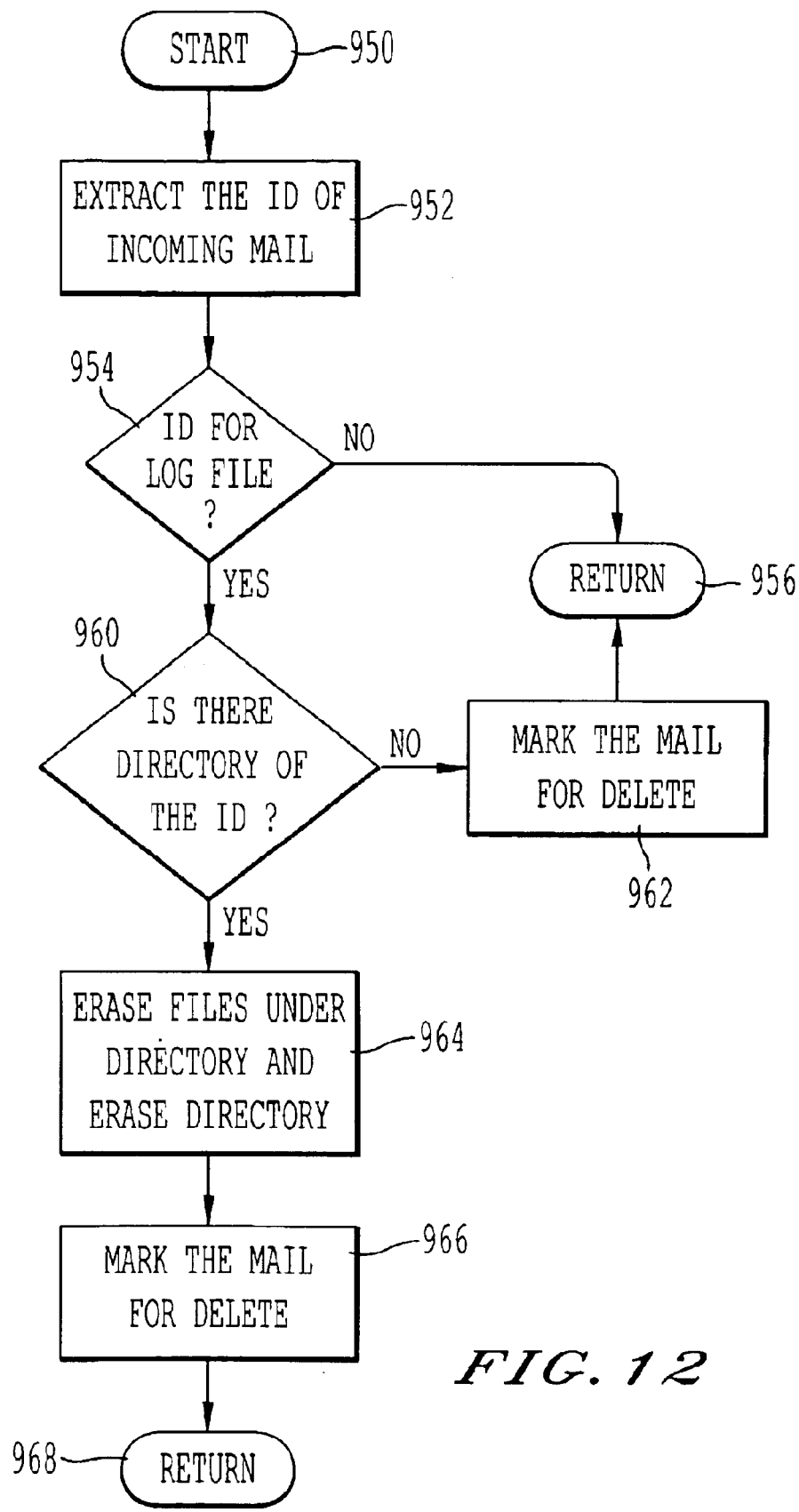
FIG. 12 is a flowchart illustrating the deletion of log data when the acknowledged e-mail is received.

FIG. 12 shows the step of receiving e-mail as an acknowledgement of a log file transfer. The e-mail receiving agent identifies the incoming message and uses a checking routine (starting with step 950) to determine if the message is an acknowledgement. At step 952, the system extracts the ID contained in the incoming message. Step 954 tests if the log filing ID exists. There may be an ID in the e-mail for another purpose. If the ID shows that the message is not for log filing, the system returns at step 956. If the ID is for log filing, then at the step 960, the directory with that ID is checked. If the directory does not exist, some error of transmission happened or a duplicate message is received. Therefore, the e-mail message is marked for deletion at the step 962 before returning to the calling function at 956. If the directory of the ID exists, then, at step 964, all the log files and the corresponding directory itself are erased. Then, the e-mail is marked for deletion at step 966 before returning to the calling function at step 968. The mail marked for deletion shall be deleted from the system because the message is handled by the receiving system.

Stored on any one or on a combination of computer readable media, the present invention includes software for controlling both the hardware of the computers and for enabling the computers to interact with a human user. Such software may include, but is not limited to, device drivers, operating systems and user applications, such as development tools. Such computer readable media further includes the computer program product of the present invention for monitoring a Business Office Appliance. The computer code devices of the present invention can be any interpreted or executable code mechanism, including but not limited to scripts, interpreters, dynamic link libraries, Java classes, and complete executable programs.

Obviously, numerous modifications and variations of the present invention are possible in light of the above teachings. It is therefore to be understood that, within the scope of the appended claims, the present invention may be practiced otherwise than as specifically described herein.

What is claimed is:

1. A computer program product comprising:

a computer storage medium and a computer program code mechanism embedded in the computer storage medium for execution on a business office appliance and for monitoring execution of a program running on the business office appliance, the computer program code mechanism comprising:

a first computer code device configured to generate a program execution log, including at least one of error messages and warnings detected in the program running on the business office appliance;

a second computer code device configured to transmit the program execution log including a logging ID, to a remote service center for diagnosis of the error messages and warnings at the remote service center; and a third computer code device configured to receive an acknowledgment that the service center received the program execution log;

a fourth computer code device configured to locally store a copy of the program execution log before the second computer code device transmits the program execution log;

a fifth computer code device configured to delete the copy of the program execution log stored locally after receiving the acknowledgment from the remote service center;

a sixth computer code device configured to store the copy of the program execution log in a directory corresponding to the logging ID; and a seventh computer code device configured to delete the directory corresponding to the logging ID along with the copy of the program execution log stored locally after receiving the acknowledgment from the service center.

2. The computer program product as claimed in claim 1, wherein the second computer code device comprises an eighth computer code device configured to transmit the program execution log via FTP.

3. The computer program product as claimed in claim 1, wherein the second computer code device comprises an eighth computer code device configured to transmit the program execution log via HTTP.

4. The computer program product as claimed in claim 1 wherein the third computer code device comprises an eighth computer code device configured to receive the acknowledgment via e-mail.

5. The computer program product as claimed in claim 4 wherein the third computer code device comprises a ninth computer code device configured to parse out the logging ID from the acknowledgment.

6. The computer program product as claimed in claim 1, wherein the first computer code device comprises an eighth computer code device configured to include usage history messages in the program execution log.

7. A computer implemented method, executed on a business office appliance, for monitoring execution of a program running on the business office appliance, comprising the steps of:

generating a program execution log, including at least one of error messages and warnings detected in the program running on the business office appliance;

transmitting the programming execution log, including a logging ID, to a remote service center for diagnosis of the error messages and warnings at the remote service center;

receiving an acknowledgment that the service center received the programming execution log;

storing, locally, a copy of the program execution log before transmitting the program execution log;

deleting the copy of the program execution log stored locally and the directory corresponding to the logging ID after receiving the acknowledgment from the remote service center;

wherein the storing step comprises storing the copy of the program execution log in a directory corresponding to the logging ID.

8. The method as claimed in claim 7, wherein the step of transmitting comprises transmitting the program execution log via FTP.

9. The method as claimed in claim 7, wherein the step of transmitting comprises transmitting the program execution log via HTTP.

10. The method as claimed in claim 7 wherein the receiving step comprises receiving the acknowledgment via e-mail.

11. The method as claimed in claim 10 wherein the receiving step further comprises parsing out the logging ID from the acknowledgment.

12. The method as claimed in claim 7, further comprising the step of adding usage history messages to the program execution log.

13. A business office appliance running a program thereon, comprising:

a detector for detecting at least one of an error condition and status information in the program running on the business office appliance;

a message generator configured to generate a program execution log, including error messages and warnings based on the error conditions and status information detected by the detector in the program running on the business office appliance;

a transmitter configured to transmit the program execution log, including a longing ID, to a remote service center for diagnosis of the error messages and warnings at the remote service center; and a receiver configured to receive an acknowledgment that the service center received the program execution log;

a storage device configured to locally store a copy of the program execution log before the transmitter transmits the program execution log and delete the copy of the program execution log stored locally after receiving the acknowledgment from the service center;

wherein the storage device stores the copy of the program execution log in a directory corresponding to the logging ID; and wherein the storage device is controlled to delete the directory corresponding to the logging ID along with the copy of the program execution log stored locally after receiving the acknowledgment from the service center.

14. The business office appliance as claimed in claim 13, wherein the transmitter comprises an FTP transmitter configured to transmit the program execution log via FTP.

15. The business office appliance as claimed in claim 13, wherein the transmitter comprises an HTTP transmitter configured to transmit the program execution log via HTTP.

16. The business office appliance as claimed in claim 13 wherein the receiver comprises an e-mail receiver configured to receive the acknowledgment via e-mail.

17. The business office appliance as claimed in claim 13 wherein the receiver comprises an e-mail receiver configured to receive the acknowledgement via e-mail and parse out the logging ID from the acknowledgment.

18. The business office appliance as claimed in claim 13, wherein the message generator further comprises a usage history monitor configured to include usage history messages in the program execution log.

19. The computer program product as claimed in claim 1, wherein the second computer code device comprises an eighth computer code device configured to transmit the program execution log via e-mail.

20. The method as claimed in claim 7, wherein the step of transmitting comprises transmitting the program execution log via e-mail.

21. The method as claimed in claim 13, wherein the transmitter comprises an e-mail transmitter configured to transmit the program execution log via e-mail.

* * * * *